(12) United States Patent
Burriss et al.

(10) Patent No.: US 6,766,519 B1
(45) Date of Patent: Jul. 20, 2004

(54) GENERIC SOFTWARE INTERFACE FOR HARDWARE ENVIRONMENTS HAVING EXECUTING CODE REGISTERS ITSELF AND THE CODE FOR A NEXT SUBOPERATION

(75) Inventors: Michael Lee Burriss, Raleigh, NC (US); Stephen Gardner Worth, III, Fuquay-Varina, NC (US); Jerry W. Huff, Durham, NC (US); Paul A. Bong, Apex, NC (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/277,414

(22) Filed: Mar. 26, 1999

(51) Int. Cl.[7] .............................................. G06F 13/10
(52) U.S. Cl. ..................................... 719/321; 719/328
(58) Field of Search ............................... 709/321, 328, 709/327; 719/321

(56) References Cited

U.S. PATENT DOCUMENTS

| | | | | |
|---|---|---|---|---|
| 5,454,110 A | * | 9/1995 | Kannan et al. ................. | 713/2 |
| 5,790,846 A | * | 8/1998 | Mealey et al. ............... | 712/244 |
| 5,809,303 A | * | 9/1998 | Senator ....................... | 395/681 |
| 6,253,320 B1 | * | 6/2001 | Sekiguchi et al. ............. | 713/2 |
| 6,381,682 B2 | * | 4/2002 | Noel et al. ................... | 711/153 |

* cited by examiner

*Primary Examiner*—Meng-Al T. An
*Assistant Examiner*—The Thanh Ho
(74) *Attorney, Agent, or Firm*—Gordon E. Nelson

(57) ABSTRACT

A generic interface layer for providing a generic interface to a hardware environment for a program executing on the hardware environment. The generic interface layer, is interrupt-driven. It includes driver code for devices in the hardware environment that is executed in response to software interrupts from the program and interrupt handling code for handling interrupts from the hardware environment. The interrupt handling code responds to an interrupt by calling a callback in the program. The generic interface layer includes a loader for loading the program and a debugger for controlling execution of the program.

Execution of code in the generic interface layer may be coordinated by the system timer interrupt code that is executed in response to a system timer interrupt. Code that is executing in the generic interface layer may register itself or other code with the system timer interrupt code, which then executes the code in response to a system timer interrupt. One use of the technique is to permit driver code to register other code and then quickly return to the program and thereby prevent long suspension of the program.

Also disclosed is a technique for managing a statically-allocated array of buffers for receiving LAN packets to reduce the frequency of an "out of resource" condition.

7 Claims, 10 Drawing Sheets

| GHE Layer 201 Call | Gate number, 505 |
|---|---|
| SetCallBack | 64 |
| RetunToSCM | 65 |
| PutChar | 66 |
| GetChar | 67 |
| GetSystemConfiguration | 68 |
| DoSCSICmd | 69 |
| ResetSCSIBus | 70 |
| GetLANBuffer | 71 |
| TransmitLANBuffer | 72 |
| ReceiveLANBuffer | 73 |
| FreeLANBuffer | 74 |
| GetLANStatus | 75 |
| SetLANAddress | 76 |
| ResetLAN | 77 |
| SendSerialChar | 78 |
| ReceiveSerialChar | 79 |
| ResetSerialPort | 80 |

Fig. 5

GENERIC SOFTWARE INTERFACE FOR HARDWARE ENVIRONMENTS HAVING EXECUTING CODE REGISTERS ITSELF AND THE CODE FOR A NEXT SUBOPERATION

BACKGROUND OF THE INVENTION

1. Field of the Invention

The invention relates generally to interfaces used by programs to control and respond to components of a computer system and more specifically to the interfaces used by programs to control and respond to hardware environments.

2. Description of the Prior Art

When all is said and done, what a computer program does is control and respond to hardware devices. When a user types a character on the keyboard, the program executing on the computer system responds to the input from the keyboard hardware by causing the computer system to execute instructions which in turn cause the display terminal to display the typed character. Because the computer program controls and responds to hardware devices, the instructions in the program vary depending on the kinds of hardware devices being used.

One example of this is the form of the instructions themselves: each kind of computer has a set of instructions defined for it, and a program which is to execute on that kind of computer must be written using that set of instructions. Another example is the kinds of peripheral devices in the computer system. A peripheral device is a device such as a keyboard, a display, a disk drive, or a printer that works with the computer but is separate from it. A program written for a system with one kind peripheral device will not work on a system that uses a different kind of peripheral device, even though both systems have a computer that executes the same instruction set. For example, a program written for one kind of keyboard will not work with another kind of keyboard.

From early on, programmers have taken measures to decrease the dependence of their programs on hardware. The general technique for doing this has been for the programs to deal with the hardware in logical rather than physical terms to the greatest extent possible. The problems posed by the different instruction sets employed by various computer systems have been solved by writing the programs in high-level languages, which deal in logical operations such as assignment of a value to a variable or branching according to the value of a variable rather than in the physical operations performed by a given computer system's instruction set. A compiler program then automatically translates the program written in the high-level language into an equivalent program written in the given computer's instruction set.

Compilers have not, however, been able to solve the problem of dealing with differing peripheral devices. That problem is dealt with at present by the computer system's operating system. An operating system is a computer program that manages the hardware making up a computer system and presents the hardware to the applications programmer as a set of generic entities. The applications programmer thus writes code for a generic keyboard, display, or file system and the operating system deals with the peculiarities of the system's actual keyboards, displays, and file systems. For example, from the point of view of the applications programmer, a keyboard is simply a source of character codes, and the operating system provides the applications programmer with a generic keyboard that is exactly that, while itself dealing with the peculiarities of the particular keyboards being used in the computer system.

FIG. 1 shows a typical computer system 101. Computer system 101 includes a processor 103, memory 111, and a number of peripheral devices 105(0 . . . n). Processor 103 and peripheral devices 105(0 . . . n) are coupled to memory 111 by bus 109, and can thus read data 112 from and write data 112 to memory 111. Processor 103 further reads instructions 114 from programs stored in memory 111 and executes them. Where the program involves peripheral devices, processor 103 responds to the instructions relevant to the peripheral devices by sending control signals to them. When something happens in a peripheral device that requires intervention of processor 103, the peripheral device sends an interrupt to processor 103. In response to the interrupt, processor 103 executes code in memory 111. For example, when a user strikes a key on a keyboard, an interrupt results whose associated code may cause processor 103 to put the character received from the keyboard into a predetermined location in memory for later use by a program that displays characters on a display device.

The programs in memory 111 include one or more applications programs 123, operating system 117, and BIOS 113, a low-level program that provides basic I/O services to operating system 117. BIOS 113, processor 103 and peripheral devices 105(0 . . . n) make up hardware environment 102 of system 101. The makers of hardware environment 102 generally provide a BIOS 113 suited for the environment they are providing.

Operating system 117 makes it possible for applications program 123 to ignore the peculiarities of peripheral devices 105(0 . . . n) and of the interrupts they provide to processor 103. Operating system 117 presents an operating system interface 121 to applications program 123 in which the facilities of computer system 101 appear as generic devices. Thus, a peripheral device 105(i) which is a keyboard appears to application program 123 simply as a source of characters. Operating system 117 is made up of hardware environment-independent code and data 118, which is not affected by the peculiarities of hardware environment 102, and hardware-dependent code and data 119, which is. Two important components of hardware-dependent code and data 119 are device drivers 120 and interrupt handlers 122. A device driver is a program whose code is dependent on the peculiarities of a given peripheral device 105(i), typically because it controls peripheral device 105(i). An interrupt handler is code which processor 103 executes in response to an interrupt from a given peripheral device 105(i). As one would expect, this code is also dependent on the peculiarities of the given peripheral device.

Compilers and operating systems together have made it possible for applications programs to be portable, that is, an application program written for a given operating system can be recompiled to run on any computer system that uses the operating system. However, as one would expect from the role of the operating system in dealing with the hardware environment, operating systems are not portable. Even after the code for an operating system has been recompiled so that it is made up of instructions belonging to processor 103's instruction set, the hardware-dependent code and data 119 must be rewritten to deal with the new hardware environment 102. This process of rewriting the hardware-dependent code and data is termed porting the operating system to the hardware environment. Porting an operating system is difficult, slow, and requires an extensive knowledge of both the new hardware environment 102 and at least the hardware-dependent code and data portion of the operating system.

What is needed is a technique which permits many hardware environments to be presented to the operating system by means of a single generic interface, thereby making it possible to replace the hardware environment-dependent code in the operating system with code that is dependent on the single generic interface, rather than a particular hardware environment. It is an object of the present invention to provide such a technique.

SUMMARY OF THE INVENTION

The invention provides a generic interface layer which executes in a hardware environment and in turn provides a generic interface to the hardware environment to a program such as an operating system that uses the generic interface layer to control and respond to the hardware environment. As mentioned above, the hardware environment includes a number of devices and produces a number of different kinds of interrupts.

The generic interface layer is made up of executable code including driver code for the devices and interrupt handler code which is executed in response to the interrupts. When executed, the interrupt handler code performs callbacks to callback code in the program that is executing on the generic interface layer. The generic interface layer further includes a generic interface to the driver code which the program uses to execute the driver code. In a preferred embodiment, the generic interface is made up of software interrupts, with the program specifying a software interrupt and the generic interface layer responding thereto by executing the corresponding driver code.

Also implemented in the generic interface layer is a loader that will load and begin execution of any program that can execute on the generic interface layer. The loader is able to locate the program in a set of files accessible to the hardware environment, load the program into memory, and set up the hardware environment so that it begins executing the program. The generic interface layer further includes a debugger mode which permits a user of the generic interface layer to control execution of a program running on the generic interface layer.

The generic interface layer uses system clock interrupt code that is executed in response to a system clock interrupt in the hardware environment to coordinate execution of code that does parts of complex operations. Code that executes in the generic interface layer can register itself or other code belonging to the generic interface layer with the system clock interrupt code. When the system clock interrupt code executes in response to the system clock interrupt, it executes the registered code.

One use of this capability is to keep the program that is executing on the generic interface layer from being suspended while the generic interface layer performs an operation which may take considerable time. The operation of course begins with a call by the program being executed by the generic interface layer to a driver; the driver registers a program which performs a component of the operation with the system clock interrupt and returns, thereby permitting the program to continue execution. In response to the next system clock interrupt, the component program is executed; if it can run, it does so, if it cannot, it reregisters itself. It may also of course register a program for another component of the operation. When the operation has been completed, the last component does a callback to the program indicating the result of the operation.

The generic interface layer finally includes an implementation of a technique for managing an array having a fixed number of buffers (0 . . . n) for receiving LAN packets. The LAN packets are stored in a queue of the buffers, with the queue being made up of successive buffers in the array, with buffer (n) being succeeded by buffer (0). If buffer (i) is the head of the queue, buffer (i−1) is always the only buffer in the array whose end-of-buffer bit is set. As the head of the queue moves in the array, the end-of-buffer bit moves with it.

Other objects and advantages will be apparent to those skilled in the arts to which the invention pertains upon perusal of the following Detailed Description and drawing, wherein:

BRIEF DESCRIPTION OF THE DRAWING

FIG. 5 shows the generic device driver interface in a preferred environment;

Figure 1:
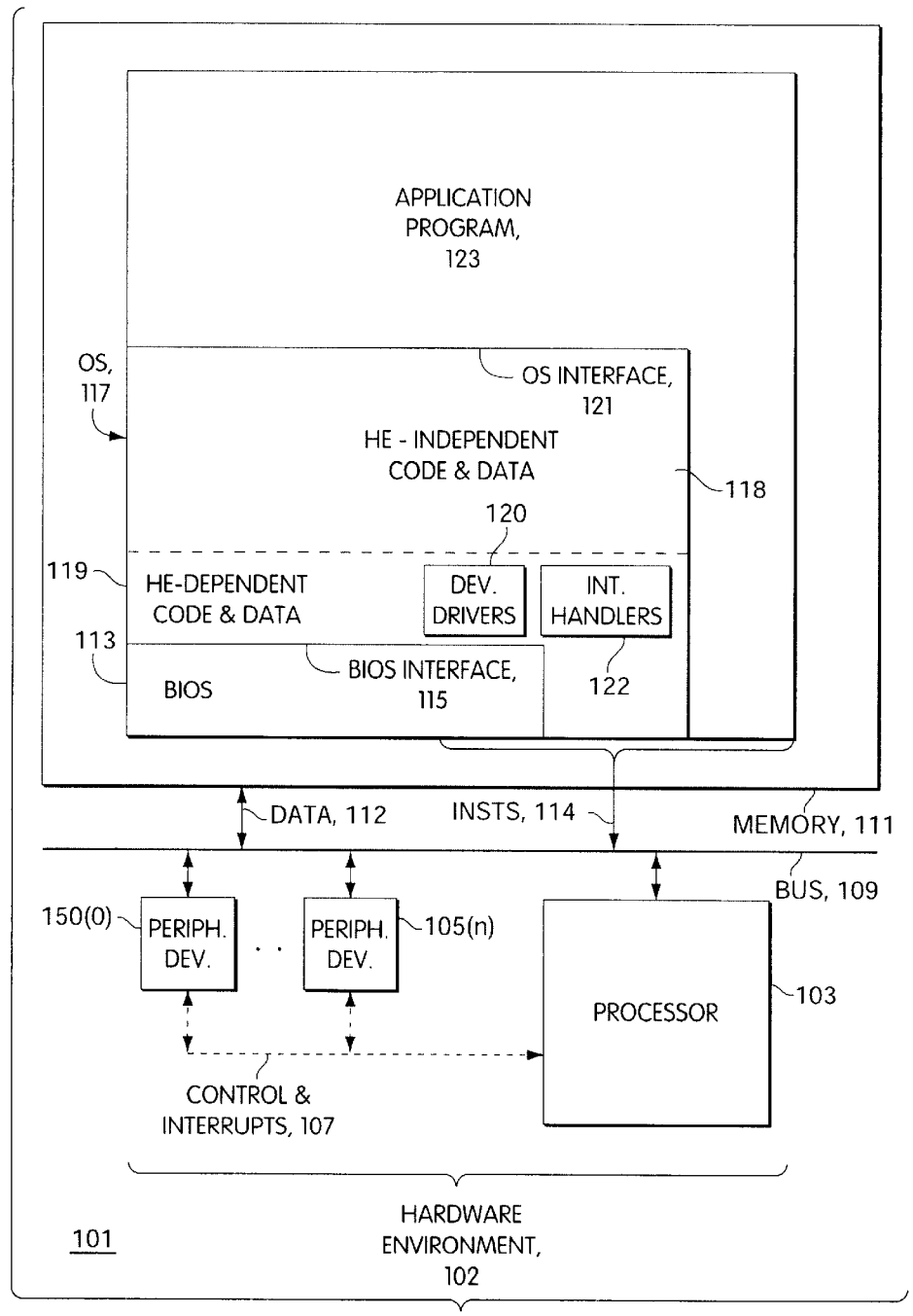
FIG. 1 shows a prior-art computer system with an application program, operating system, and hardware environment.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will first present an overview of the invention and will then present a detailed description of a preferred embodiment.

Figure 2:
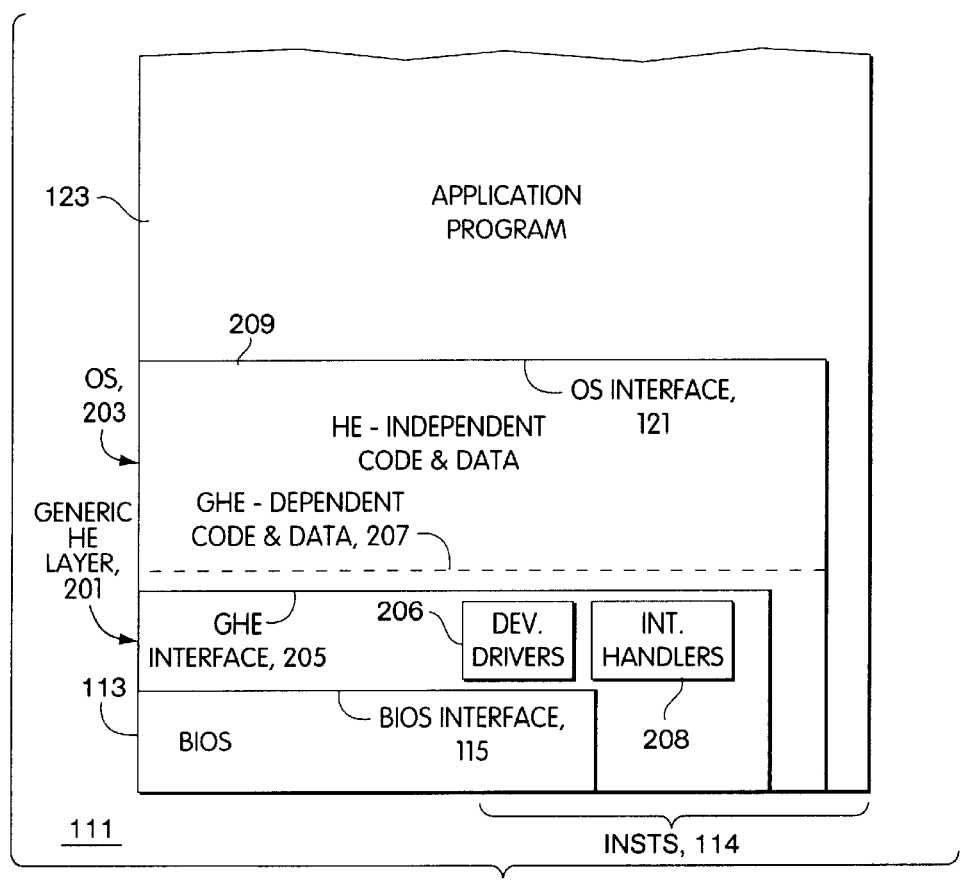
FIG. 2 is a high-level block diagram of an operating system and a generic hardware environment interface layer.
Figure 3:
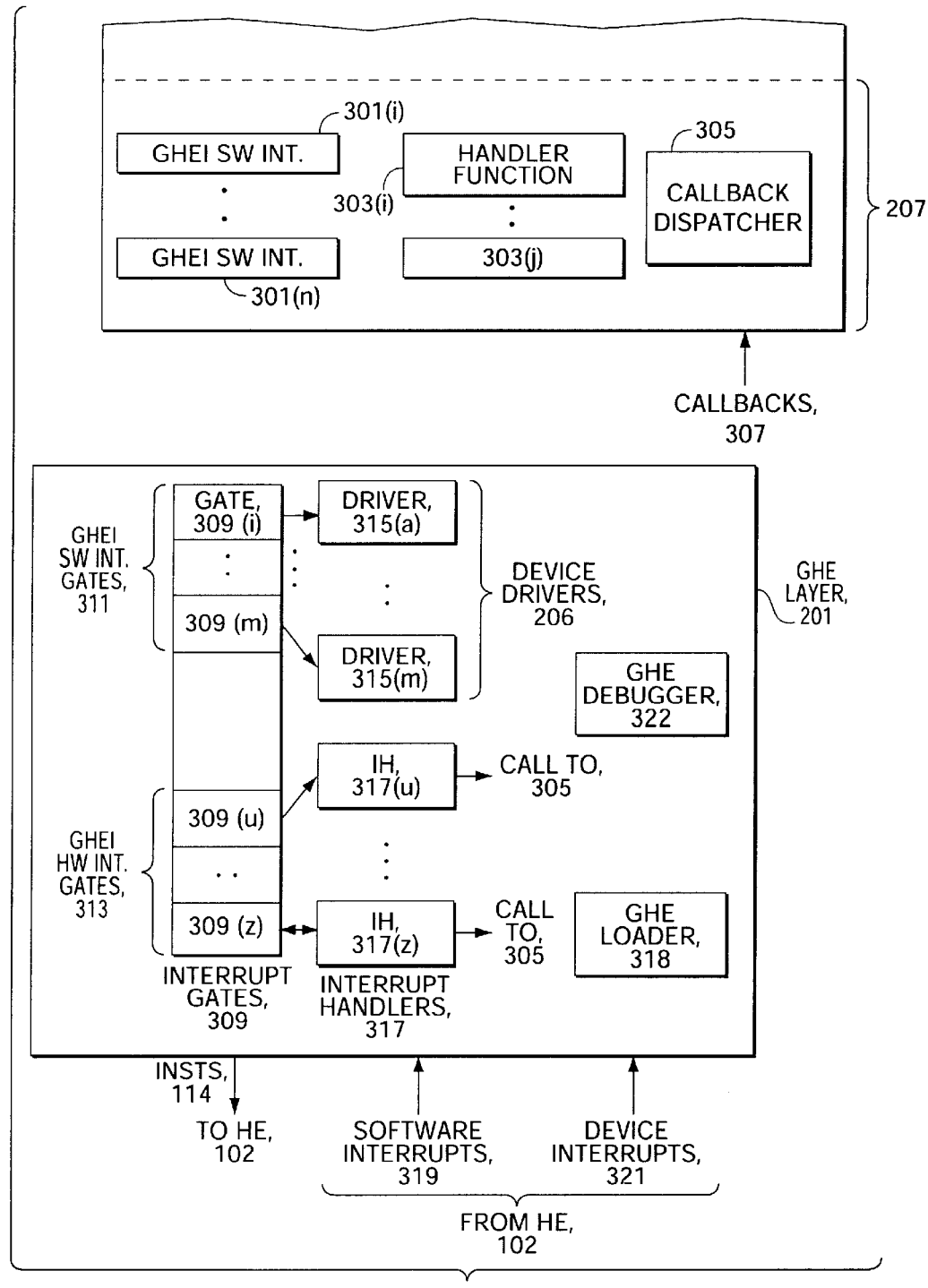
FIG. 3 is a high-level block diagram of the interaction between the operating system, the generic hardware environment interface layer, and a specific hardware environment.

Overview of the Invention: FIGS. 2 and 3

FIG. 2 shows memory 111 in a computer system that uses the invention to reduce the effort of porting an operating system to a new hardware environment. As before, memory 111 includes an application program 123, a bios 113, and an operating system 203. However, the hardware-dependent code and data 119 of operating system 107 has been replaced by generic hardware environment code and data 207 and a new element has been added: generic hardware environment layer 201. Generic hardware environment code and data 207 no longer contains device drivers or interrupt handlers; these are now found at 206 and 208 in generic hardware environment layer 207. As before, device drivers 206 and interrupt handlers 208 are specific to a given hardware environment 102. Generic hardware interface layer 201 presents generic interfaces 205 to operating system 203 for the device drivers 206 and the interrupt handlers 208. Thus, as long as there is a generic hardware environment layer 201 for a given hardware environment 102, an operating system such as operating system 203 that uses the generic interfaces 205 will work with that hardware environment.

When an operating system uses a generic hardware interface layer 201, it is the generic hardware environment layer 201, instead of the operating system, that must be ported to a new hardware environment. Generic hardware environment layer 201 is much simpler than an operating system, and porting it is consequently easier. Moreover, since generic hardware environment layer 201 offers generic device driver and interrupt handling facilities to the operating system, the programmers who port generic hardware environment layer 201 to a new hardware environment need know nothing whatever about the operating system to do the porting.

FIG. 3 shows the interaction between generic hardware environment layer 201, operating system 207, and hardware environment 102 in a preferred embodiment. The code for generic hardware environment layer 201 is executed by the same process that executes GHE-dependent code and data 207 and data used by both generic hardware environment layer 201 and GHE-dependent code and data 207 is in a portion of that process's address space which is accessible to both generic hardware environment layer 201 and GHE-dependent code and data 207.

Execution of the code in generic hardware environment layer 201 is interrupt driven, that is, processor 103 executes programs in generic hardware environment layer 201 in response to interrupts or exceptions from components of computer system 101. There are two sources for such interrupts or exceptions: the hardware components of hardware environment 102, which produce what will be termed herein device interrupts 321, and execution of programs, which produce software interrupts 319. Included in the instructions executed by processor 103 is a software interrupt instruction; when processor 103 executes a software interrupt instruction, it behaves exactly as if it had received an interrupt from a component of hardware environment 102. All device interrupts 321 produced by hardware environment 102 are handled by generic hardware environment layer 201 instead of by operating system 207; as will be explained in more detail later, operating system 207 uses software interrupts to invoke the device drivers 206 in generic hardware environment layer 201.

Processor 103 responds to a given interrupt or exception by executing an exception handler or interrupt handler program such as those shown at 122 and 208. The interrupts and exceptions are related to their handler programs by interrupt gates, shown at 309. For a given interrupt, there is an interrupt gate 309(i) corresponding to the interrupt. Included in interrupt gate 309(i) for the interrupt is a specifier from which the interrupt handler for the interrupt can be located. Thus, when processor 103 receives an interrupt, it finds gate 309(i) corresponding to the interrupt and uses the specifier to locate the interrupt handler for the interrupt. Thereupon, processor 103 executes the interrupt handler. Also included in the instructions executed by processor 103 are instructions which disable and enable interrupts; when an interrupt is disabled, processor 103 does not respond to an occurrence of the interrupt, and consequently, the interrupt handler is not executed. These instructions can disable individual interrupts or can disable all interrupts.

In addition to receiving software interrupts from operating system 203, generic hardware environment layer 201 makes callbacks to operating system 203. Callbacks are a way of dynamically making code in one program available to another program. Here, the code is callback dispatcher 305. To make callback dispatcher 305 available to generic hardware environment layer 201, operating system 203 registers the function with GHE layer 201 by providing GHE layer 201 a pointer to the function. After the function is registered, the interrupt handlers 317 for all of the interrupt gates 313 for the hardware interrupts call callback dispatcher 305; thus, whenever a device interrupt 312 occurs, the result is a callback to callback dispatcher 305.

GHE layer 201 thus uses callback dispatcher 305 to indicate to operating system 203 that a given device interrupt or exception has taken place and to provide information about the interrupt or exception to operating system. More particularly, when an interrupt handler 317(i) makes the callback to callback dispatcher 305, it provides an identifier for the interrupt or exception, information about the interrupt or exception, and a pointer to machine register state which GHE layer 201 saved when the interrupt or exception occurred. Callback dispatcher 305 then calls a handler function 303 corresponding to the interrupt specified by the identifier and the handler function uses the information about the interrupt and the saved state to do whatever processing is necessary at the operating system level.

Together, the software interrupts and information provided to callback dispatcher 305 make up generic hardware environment interface 205. Device drivers are specified in the software interrupts by the numbers of the gates 311 in gates 309. Each of these gates has associated with it a driver 315 for one of the devices. To use a given device driver, operating system 203 simply does a software interrupt specifying that driver and passes the driver generic information that it needs to deal with the device. Operating system 203's interface to the device drivers is thus completely independent of the actual device drivers 315 for the particular hardware environment 102 and therefore of hardware environment 102. Operating system 203's interface to the device drivers appears as GHEI SW interrupts 301(i . . . n) in FIG. 3 For example, to get a character from serial character device such as a keyboard, the operating system simply specifies the gate for the serial character device driver and the number of the serial port to which the keyboard is connected. Similarly, as indicated above, with each callback, operating system 203 gets a handle indicating the interrupt or exception, further information about the interrupt or exception, and a pointer to the state saved when the interrupt or exception occurred. What the handler functions 303 receive in operating system 203 is thus completely independent of the details of the devices that generated the interrupts.

Overview of Operation of Generic Hardware Environment Layer 201

Operation of generic hardware environment layer 201 will be shown using the example of input from a typewriter keyboard. When the user of the keyboard presses a key, the character code for the character represented by the key is placed in a queue in memory accessible to processor 103 and the keyboard sends an interrupt to processor 103. The gate for the interrupt is in GHE hardware interrupt gates 313, so processor 103 executes an interrupt handler 317 which in turn calls callback dispatcher 305. The call's arguments include an identifier for the serial character interrupt, the port number on which the interrupt occurred, and the state that was saved when the interrupt occurred. Callback dispatcher 305 invokes handler function 303(i) for the serial character interrupt using the port number. Hander function 303(*i*) in turn issues the software interrupt specifying driver 315(*i*) for reading from serial character devices and the port number. When the software interrupt occurs, the result is the execution of driver 315(*i*), which reads the character at the head of the queue belonging to the port and returns it to handler function 303(*i*), which in turn provides it to the program which is receiving input from the keyboard and returns. Callback dispatcher 305 then returns, and GHE layer 201 remains inactive until the next hardware or software interrupt occurs.

Details of a Preferred Embodiment

The generic HE layer 201 of the invention was developed to simplify porting an operating system originally written for Motorola 88000 hardware to a hardware environment which employed an Intel Pentium(g processor and which was specialized for high-speed access to a local-area network (LAN) and an array of disk drives that obey the SCSI protocol.

Figure 4:
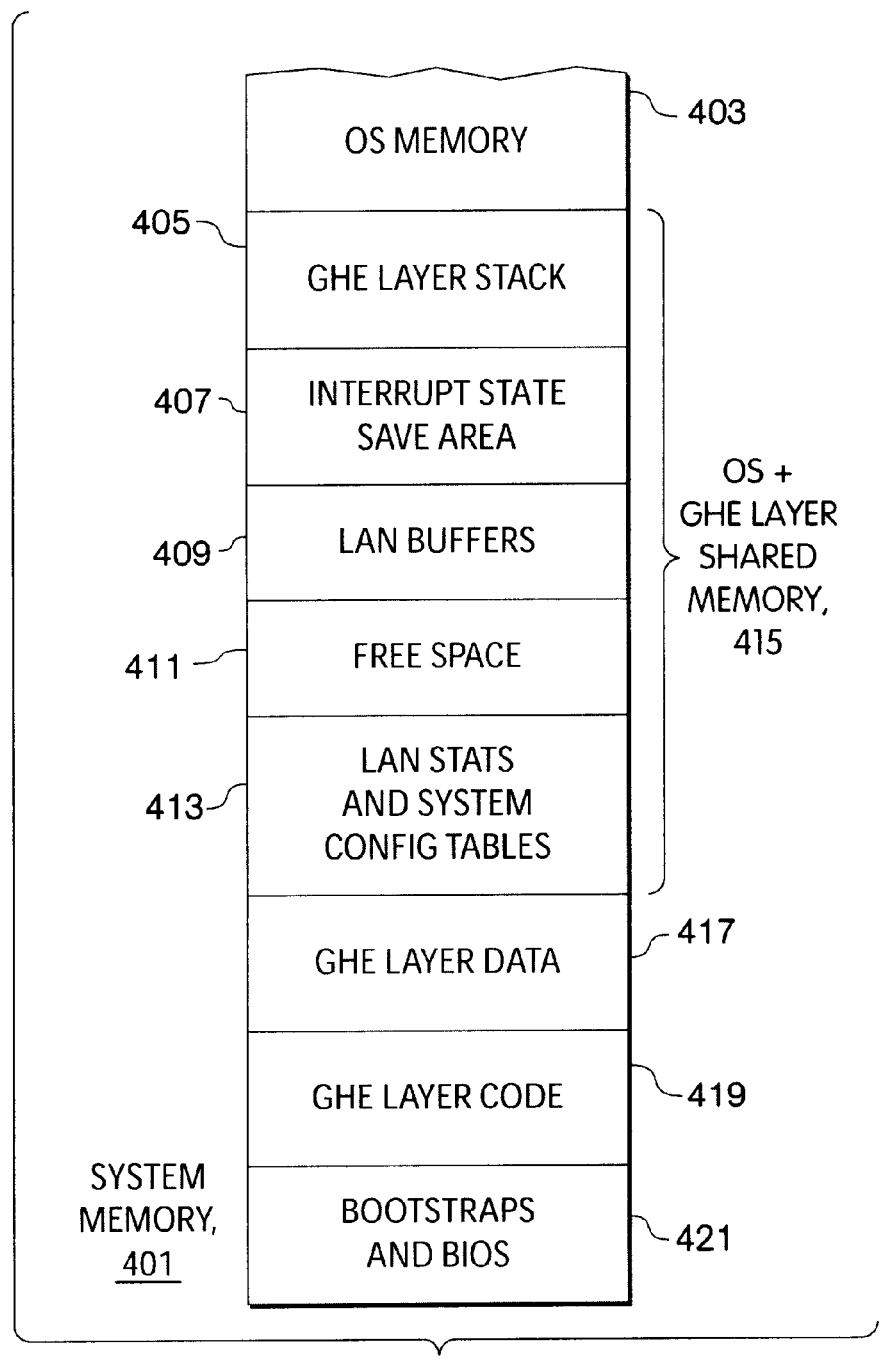
FIG. 4 is a diagram of the memory layout in a preferred embodiment of the generic hardware environment interface layer.

Memory Arrangement in a Preferred Environment: FIG. 4

FIG. 4 is a detail of system memory 401 for operating system 203 and generic HE layer 201. At the top of system memory 401 is memory 403 reserved for OS 203; then comes memory 415 which is shared by both generic HE layer 201 and OS 203; at the bottom of system memory 401 is memory 417 for data private to generic HE layer 201, memory 419 for generic HE layer 201's code, and memory 421 for BIOS 113 and the bootstrap code needed to get the system running.

OS and GHE layer shared memory 415 includes areas for storing state for the programs that are executed in consequence of the interrupts received in GHE layer 201, areas for storing data needed for the LAN operations, and areas for storing system configuration information. Beginning with GHE layer stack 405, device drivers 206, interrupt handlers 317, callback dispatcher 305, and handler functions 303 all execute on GHE layer stack 405. Each time GHE layer 201 responds to an interrupt, it saves the current state of certain registers in processor 103 in interrupt state save area 407, where the state is available for examination and limited modification by the handler function 303 that is invoked as a result of the callback made in response to the interrupt. On return from the driver 315 or callback 305 executed in response to the interrupt, GHE layer 201 restores the saved state. If the saved state has been modified, GHE layer 201 restores the modified state. In a preferred environment, GHE layer 201 disables interrupts when it responds to either a software or hardware interrupt. Some interrupts, however, cannot be disabled. To deal with this problem, GHE layer 201 includes sufficient storage in interrupt state save area 407 for register state from three interrupts.

LAN buffers 409 store data that is output to or has been received from the LANs that are part of hardware environment 102. Free space 411 is exactly that, and is available generally for information to be shared between GHE layer 201 and operating system 203. LAN stats and system configuration tables 413 contain statistical and configuration information needed by both GHE layer 201 and operating system 203.

The Generic Device Driver Interface in a Preferred Environment: FIG. 5

FIG. 5 shows the generic device driver interface for the preferred embodiment. Each device driver is associated with an interrupt gate 309, and table 501 shows the relationship between the drivers and the interrupt gate. A call to a device driver is made by pushing any arguments required for the device driver onto a frame in operating system 203's stack and then copying the arguments onto GHE layer stack 405 and issuing a software interrupt instruction for the interrupt gate number 309(*i*) associated with the device driver. For example, the generic device driver interface for sending serial characters is SendSerialChar, shown at 519. Two arguments are required: the port number for the serial port from which the serial character is to be sent and the character itself. Code in GHE dependent code and data 207 that sends a serial character will first push the arguments onto the stack frame and then issue a software interrupt instruction with the gate number 78.

Continuing with the functions of table 501 in more detail, SetCallBack 507 provides the information needed to call callback dispatcher 305 to the interrupt handlers 317. ReturnToScm 509 is a software interrupt which places GHE layer 201 in a debugging mode. The functions listed at 511 are for simple character I/O, with output going to a character monitor and input coming from a keyboard. They are used for debugging. GetSystemConfiguration obtains current configuration information about hardware environment 102. The information is contained in a buffer accessible to GHE layer 201. The following table shows the information:

| Value | Offset |
| --- | --- |
| Interface revision number | 0x0000 |
| Implementation revision number | 0x0002 |
| Number of SCSI buses | 0x0004 |
| Configured serial ports (bit field, bit 0 - COM1, bit 1 - COM2, if bit value is set ("1") COM port is configured, if bit value is clear ("0") COM port is not configured.) | 0x0006 |
| Memory size in bytes | 0x0008 |
| Processor clock frequency in Hz | 0x000C |
| Pointer to boot string used to boot operating system 203, null-terminated | 0x0010 |
| Pointer to the default LAN MAC address (value is stored as 6 unsigned characters) | 0x0014 |
| Pointer to the current LAN MAC address (value is stored as 6 unsigned characters) | 0x0018 |

At 515 is shown the interface to the SCSI disk drives that are connected to the hardware environment's SCSI buses. DoSCSICmd specifies a SCSI command. The argument that operating system 203 provides with DoSCSICmd specifies a command block that has the following contents, some of which is provided by operating system 203 and other of which is filled in by GHE layer 201 as the SCSI command is executed:

| Value | Offset |
| --- | --- |
| SCSI Bus number | 0x0000 |
| Target Id | 0x0001 |
| Target LUN | 0x0002 |
| CDB size - 6, 10, or 12 | 0x0003 |
| CDB pointer | 0x0004 |
| Buffer size - provided by OS 203 | 0x0008 |
| Buffer pointer - provided by OS 203 | 0x000C |
| SCSI status - filled in by GHE layer 201 before callback | 0x0010 |

-continued

| Value | Offset |
|---|---|
| Sense data size - provided by OS 203 | 0x0014 |
| Sense data pointer - filled in by GHE layer 201 before callback | 0x0018 |

The DoSCSICmd can be used generally to illustrate how the device driver interface and the callback interface cooperate. When GHE layer 201 responds to the software interrupt resulting from operating system 203 issuing a software interrupt instruction specifing gate 69, it first disables all interrupts and saves current register state in interrupt state area 407. Then it calls driver 315(i) corresponding to gate 69, which uses the information in the command block to execute a SCSI command. Driver 315(i) executes on a frame in GHE layer 201's stack 405. When GHE layer 201 returns from executing driver 315(i), it reenables the interrupts, restores the saved register state from interrupt state area 407, and the software interrupt returns control to operating system 203, returning a 0 in one of the saved registers to indicate that driver 315(i) successfully executed. If driver 315(i) did not successfully execute, the software interrupt returns 1 in that register.

When the SCSI device to which the SCSI command was directed has completed processing the command, it issues a device interrupt 321, which is handled by an interrupt handler 317(i) for the interrupt in GHE layer 201. Before executing interrupt handler 317(i), GHE layer 201 again disables the interrupts and saves the register state. Interrupt handler 317(i) calls callback dispatcher 305 with the following arguments: a specifier for the interrupt, in this case, a SCSI interrupt, and other information, which in this case is a pointer to the command block. Dispatcher 305 responds to the specifier for the interrupt to call the appropriate handler function 303(i) and the handler function does whatever processing is indicated by the information returned in the command block. Interrupt handler 317(i), dispatcher 305, and handler 303(i) all execute on stack frames in GHE layer stack 405. When handler function 303(i) and callback dispatcher 305 have returned, GHE layer 201restores the saved register state and again enables the interrupts.

Continuing with the remaining calls in generic interface 501, ResetSCSIBus does exactly that. The command takes the number of the SCSI bus to be reset as an argument. The device driver simply begins the SCSI bus reset operation and returns, indicating success if it was able to begin the reset operation. When the reset operation is finished, GHE layer 201 makes a callback indicating that fact to OS 203.

The calls grouped together at 517 deal with sending and receiving data via the LANs in the hardware interface. Both OS 203 and GHE layer 201 have access to LAN buffers 409; the calls GetLANBuffer, TransmitLANBuffer, ReceiveLANBuffer, and FreeLANBuffer permit OS 203 to manage these buffers. In response to GetLANBuffer, GHE layer 201 returns a pointer to a buffer; if there is no free buffer, GHE layer 201 returns 0 and when a buffer becomes free, uses a callback to callback dispatcher 305 to indicate that fact to OS 203. In response to TransmitLANBuffer, GHE layer 201 places the buffer indicated in the call's arguments in a transmit queue; when the buffer is actually transmitted, a callback to OS 203 results. In response to ReceiveLANBuffer, GHE layer 201 returns a pointer to the LAN buffer currently at the head of GHE layer 201's receive queue. If there is no buffer in the queue, GHE layer 201 returns 0 and when the queue becomes non-empty, uses a callback to dispatcher 305 to indicate that fact to OS 203. When OS 203 is done with a LAN buffer, it calls FreeLAN-Buffer so that GHE layer 201 can free the buffer for other users. iGetLANStatus permits OS 203 to obtain LAN status information maintained by GHE layer 201 in memory 413; SetLANAddress sets the hardware address of the controller which is the source of and destination for the LAN packets handled by GHE layer 201. ResetLAN resets the LAN interface. The operations performed by SendSerialChar, ReceiveSerialChar, and ResetSerialPort at 519 are the serial port I/O analogues of the operations just described for other modes of I/O.

Generic Callback Interface

In a preferred embodiment, all callbacks made to callback dispatcher 305 have the following form:

typedef void (*CallbackPtr) (long handle, long otherInfo, struct regs *rp);

CallbackPtr is a pointer to callback dispatcher 305; handle is a specifier indicating the kind of interrupt or exception that resulted in the callback; otherInfo is other information that handler function 303(i) corresponding to handle uses to deal with the interrupt or exception that caused the callback; *rp is a pointer to the location in interrupt state save area 407 of the copy of the registers that was saved when the interrupt or exception that caused the callback occurred. As indicated above, operating system 203 can modify the state pointed to by *rp, and can thus do things like switching from one process to another to handle the consequences of the interrupt that caused the callback.

Continuing in more detail, the values used in the callbacks for the various kinds of interrupts in a preferred embodiment are as follows:

1) A SCSI command block has completed execution. The otherInfo argument is the address of the SCSI command block that completed execution.
2) This callback will be posted by the LAN subsystem each time a LAN interrupt is invoked by the LAN hardware. This interrupt can result in one or more LAN packets being posted to the inbound LAN queue.
3) Outbound LAN buffer has become available.
4) Empty to non-empty transition for inbound serial queue. The otherInfo parameter specifies the number of the serial port in question, in the low-order byte.
5) Non-empty to empty transition for outbound serial queue. The otherInfo parameter specifies the number of the serial port in question, in the low-order byte.
6) Heartbeat tick interrupt. This interrupt is taken every 50 milliseconds(20 Hz) and cannot be altered. It is designed to be a highly accurate, non-drift counter. The Heartbeat tick is activated as soon as interrupts are turned on. OS 203 must ensure that callback dispatcher 305 is registered via the SetCallback call prior to enabling interrupts.
7) SCSI reset completion. The otherInfo parameter provides the number of the SCSI bus in the low two bytes; the high two bytes are zero or non-zero as the reset did or did not succeed.
8) LAN reset completion. The high two bytes of the otherInfo parameter are zero or non-zero as the operation did or did not succeed; the low two bytes are always zero.
9) Corn port reset completion. The otherInfo parameter provides the number of the corn port in the low two bytes; the high two bytes are zero or non-zero as the reset did or did not succeed.

10) Non-transient LAN problem. GHE layer 201 attempts to recover from most LAN error conditions. If it detects an error from which it cannot recover, it makes this callback.

Callback dispatcher 305 may be called reentrantly with these values:

11) Machine check exception. An unknown hardware error occurred.

12) Reserved

13) OS 203 Internal error. This will be called for any other unexpected exceptions, such as a divide-by-zero fault. In hardware environments 201 where the processor is an Intel processor, the otherInfo parameter specifies the Intel processor vector number of the exception. For those exceptions which the Intel processor treats as faults (meaning that the program counter is left pointing to the offending instruction) OS 203 must change the saved state to eliminate the problem before the callback function returns; otherwise the fault will simply be taken again.

Because the last two exceptions cannot be masked, callback dispatcher 305 must be prepared for reentrant calls; for example, a machine check exception may be taken while the callback function is processing a SCSI completion interrupt. GHE layer 201 uses a new state save area in area 407 for each reentrant call; it will properly handle up to three levels of invocation of callback dispatcher 305.

Where the processor is an Intel processor, the layout of a copy of the registers in state save area 407 is as follows:

| Saved register | Offset |
|---|---|
| EAX | 0x0000 |
| EDX | 0x0004 |
| ECX | 0x0008 |
| EBX | 0x000C |
| EBP | 0x0010 |
| ESI | 0x0014 |
| EDI | 0x0018 |
| ESP | 0x001C |
| Eflags | 0x0020 |
| EIP | 0x0024 |

Although the Eflags register appears in the state save area, GHE layer 201 permits modification only of the flags CF, PF, AF, ZF, SF, IF, OF, DF, and AC.

Figure 8:
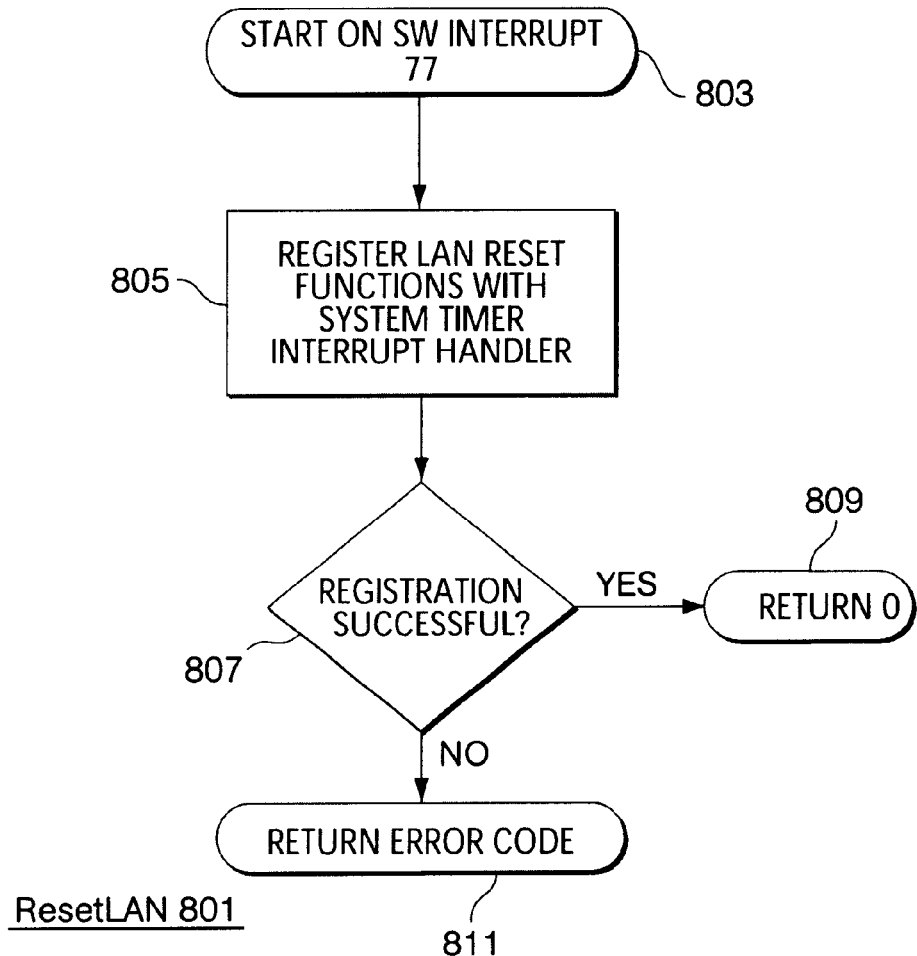
FIG. 8 is a flowchart of the ResetLAN software interrupt.
Figure 9:
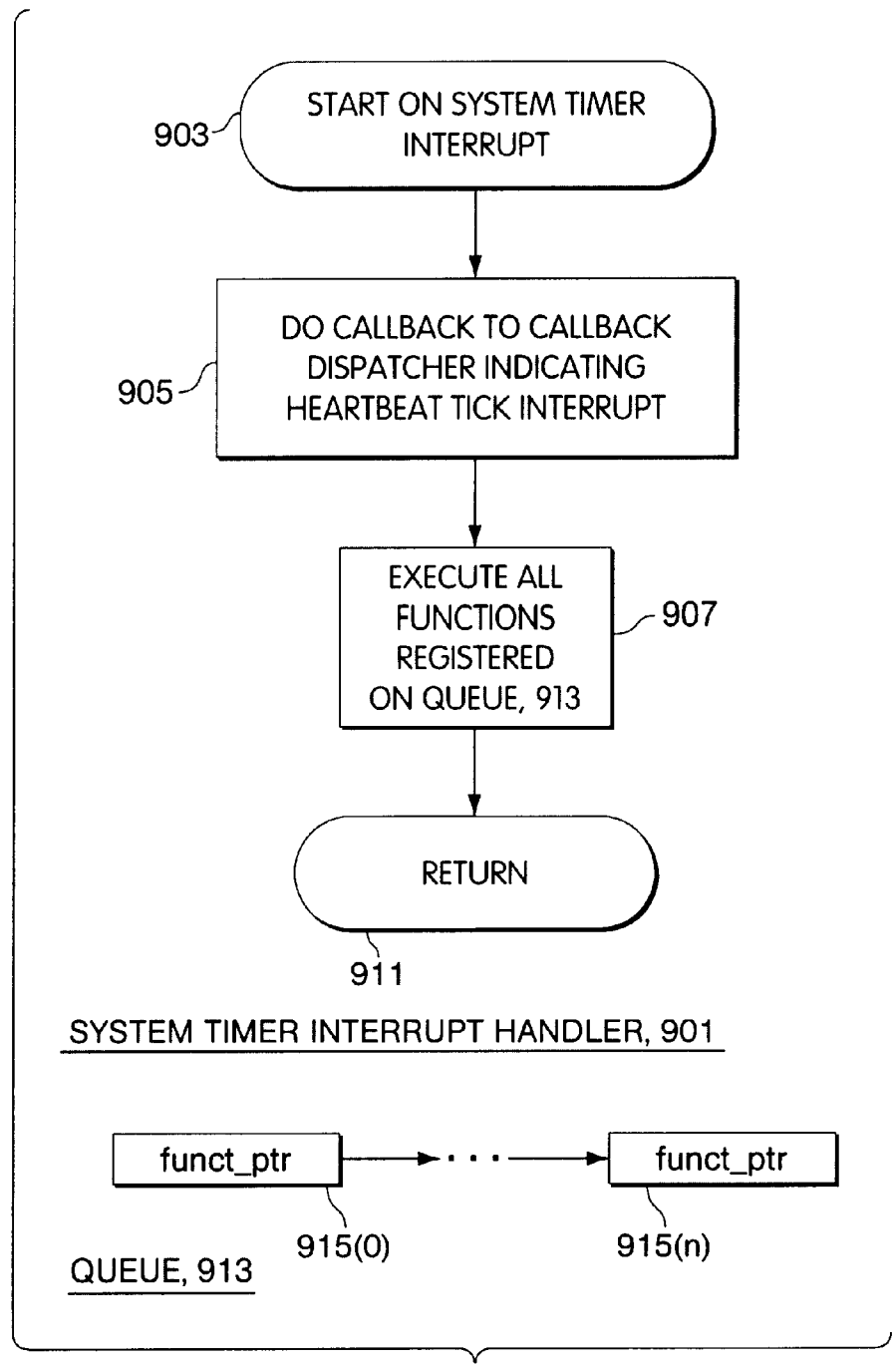
FIG. 9 is a flowchart of the system timer interrupt handler in a preferred embodiment.
Figure 10:
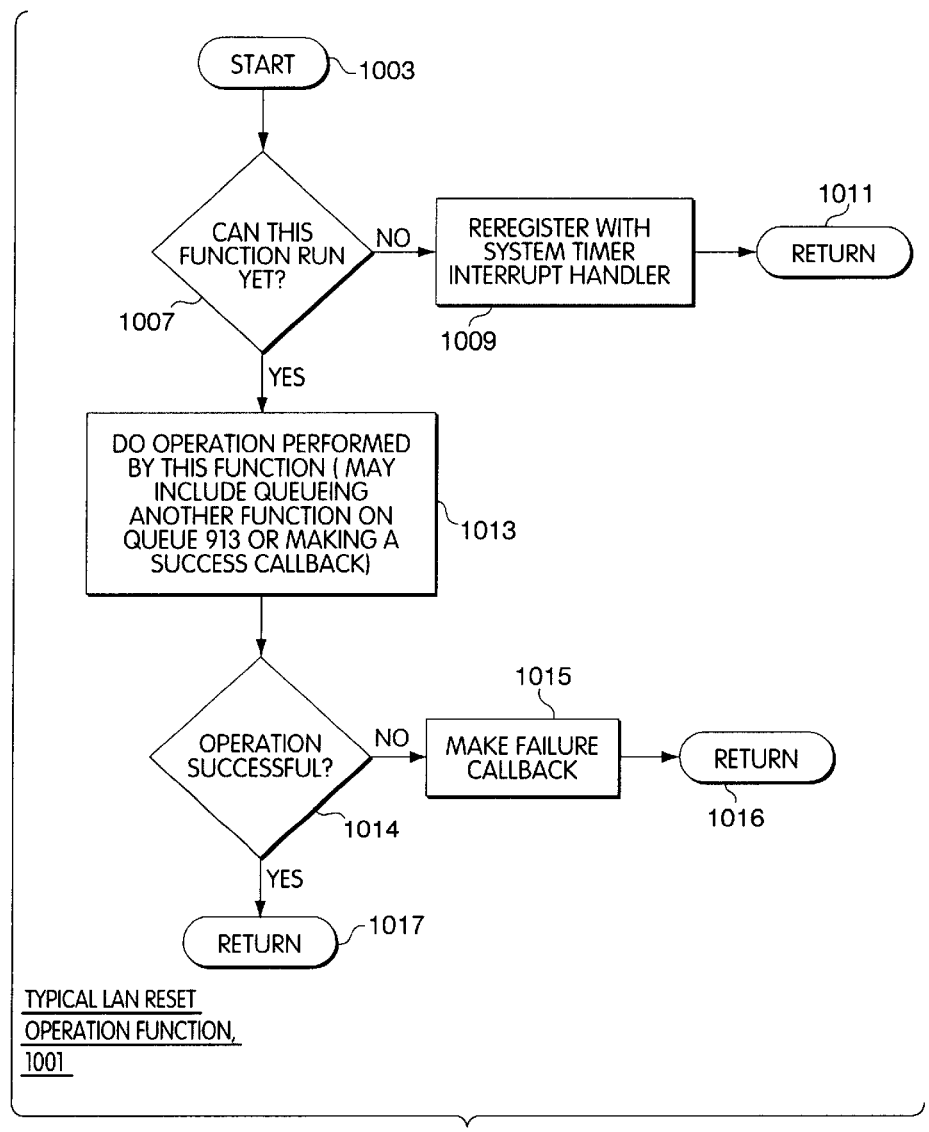
FIG. 10 is a flowchart of an operation executed by GHE layer 201 in the course of resetting the LAN controller.

Limiting the Period of Time OS 203 is Suspended Due to Operation of GHE Layer 201: FIGS. 8–10

A consequence of the fact that OS 203 interacts with GHE layer 201 by means of software interrupts and callbacks and of the fact that GHE layer 201 disables interrupts before executing the code associated with the software interrupt or executing callback dispatcher 305 and only reenables the interrupts on return from the call is that execution of OS 203 is suspended while the code associated with the system interrupt or callback dispatcher 305 is executed. If OS 203 is to have a reasonable level of performance while executing on GHE layer 201, GHE layer 201 must ensure that these suspensions do not last too long. With many operations performed by GHE layer 201, for example, resetting the LAN controller, the time to perform the operation is not only long, but unpredictably so. Acceptable performance of OS 203 thus requires that it be free to perform other operations while GHE layer 201 resets the LAN controller.

The foregoing problem is solved in GHE layer 201 by dividing long operations that are begun with software interrupts into suboperations that can proceed independently in GHE layer 201 after the software interrupt has returned to OS 203. The suboperations proceed in response to system timer interrupts received in GHE layer 201. A system timer interrupt is a device interrupt based on the system clock. Software running in computer system 101 can coordinate operation of its components by means of system timer interrupts. For example, a process might perform a function that required that it execute every five minutes; such a process would perform the function and then make an operating system wait call; the operating system would then remove the process from the processor, wait for the first system timer interrupt after the five minutes had elapsed, and respond to that interrupt by again scheduling the processor to be run.

Of course, OS 203 does not receive the system timer interrupt; the interrupt handler in GHE layer 201 for the system timer interrupt instead makes a heartbeat tick interrupt callback to OS 203 every 50 milliseconds and OS 203 can use the heartbeat tick interrupt callback to coordinate operations in the same fashion that it would otherwise use the system timer interrupt.

Returning to the performance of lengthy operations in GHE layer 201 without suspending OS 203, FIG. 8 is a flowchart of the device driver code 315(*e*) that executes in response to the ResetLAN software interrupt. ResetLAN code 801 does the absolute minimum before returning to OS 203. It performs none of the actual operations. Instead, it registers at least one of the functions which actually perform the actual operations with the interrupt handler for the system timer interrupt (805). That function and others as well will then be executed by GHE layer 201 in response to system timer interrupts. If the registration succeeds (807), code 801 returns the value 0, indicating success (809); otherwise it returns an error code (811). As will be apparent from the flowchart, execution of ResetLAN code 801 will not cause suspension of operation of OS 203 for any significant amount of time.

FIG. 9 is a flowchart of system timer interrupt handler 901, which is of course one of interrupt handlers 317. System timer interrupt handler 901 does two things: it does the heartbeat tick interrupt callback to operating system 203 (905) and on return from the callback, executes all of the functions which have been registered with system timer interrupt handler 901 (907). When a function such as Reset-LAN registers a function with system timer interrupt handler 901, it simply places a pointer to the function at the tail of a queue 913 which is read by system timer interrupt handler 901. As indicated at 907, whenever a system timer interrupt occurs, system timer interrupt handler 901 executes all of the functions that have function pointers on queue 913. When system timer interrupt handler 901 executes a function on the queue, it removes the entry 915 for the function from the queue. In the preferred embodiment, it is expected that any function on queue 913 can be executed in less than the 50 milliseconds between heartbeat tick interrupt callbacks. The interrupts remain disabled while system timer interrupt handler 901 is executing the functions on the queue.

FIG. 10 shows a typical LAN reset operation function 1001. This function performs one of the operations necessary to reset the LAN. Whether it can perform its operation depends on whether one or more other reset operations have already performed their operations. In a preferred embodiment, the operations are always executed in the same order. At decision point 1007, function 1001 determines whether it can run yet. If it cannot, it reregisters itself with system timer interrupt handler 901(1009) and returns (1011). If it can run, it does its operation (1013). As indicated there, the operation may register the next LAN reset operation function 1001 with system timer interrupt handler 901 or making a success callback. If the operation was successful (1014), function 1001 returns (1017). Otherwise, it makes a failure callback (1015) and returns.

It is of course possible for a number of functions for an operation to be registered simultaneously, with the state of the operation determining which one will be completely executed next. In such an implementation, a function would examine data indicating the state of the operation, and if the state data indicated the function could run, it would do so and change the state data. If the state data did not so indicate, the function would simply reregister itself with the system timer interrupt handler.

As will be apparent from the flowcharts of FIGS. 8–10, registration of internal GHE layer functions with system timer interrupt handler 901 not only makes it possible to execute lengthy operations in response to software interrupts without suspending OS 203, it also makes it possible to employ the same kind of coordination among internal GHE layer functions as is provided by the standard operating system wait or sleep functions, which GHE layer 201 cannot use because it operates at a level which is below these functions. The heartbeat tick callback, meanwhile, provides OS 203 the input it needs to manage its own wait or sleep functions, even though it cannot directly receive the system timer interrupt.

Figure 7:
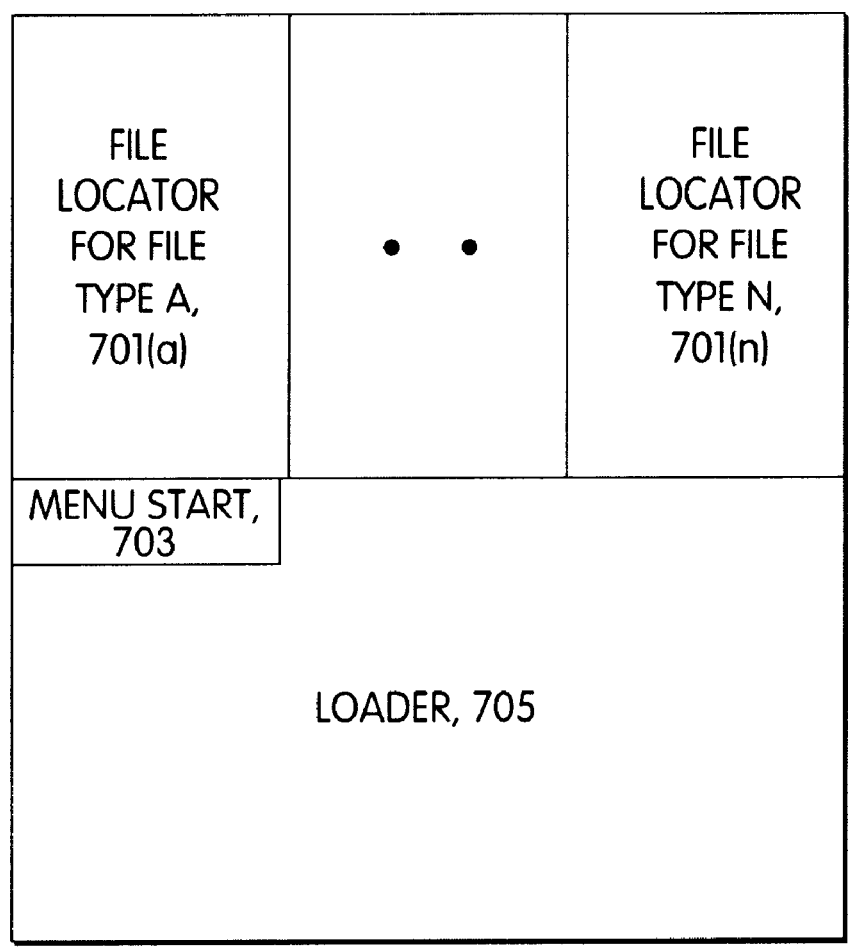
FIG. 7 is a conceptual block diagram of loader 318.

Loading Operating System 203: FIGS. 3 and 7

One of the jobs done by an operating system is loading application programs into memory 111 so that they can be executed by processor 103. Loading application programs is done by an operating system component program called a loader. Given the file name of a file that contains executable code, the loader finds the file in the computer system's file system, reads the executable code from the file into memory, and sets values in processor 103's registers so that processor 103 begins executing the instructions of the program. The operating system itself is loaded by a bootstrap program. The bootstrap program is at a known location in non-volatile memory, and when processor 103 begins operating, it automatically executes the bootstrap program. The bootstrap program loads the operating system code from a known physical location in the file system in the manner described above for an application program.

If an operating system is implemented using GHE layer 201, GHE layer 201 is the operating system's interface to the hardware environment. Consequently, GHE layer 201 must be loaded before the operating system will work. A bootstrap program that simply loads the operating system will not work, because it will not load GHE layer 201. A bootstrap program that loads only GHE layer 201 will also not work, because the operating system has not been loaded.

The solution to the problem that is used in GHE layer 201 is to include a loader for the operating system in GHE layer 201. This loader is seen at 318 in FIG. 3. GHE loader 318 is like the operating system loader in that given the name of the file that contains the operating system's executable code, it is able to locate that file in the file system and having found the file, it loads the executable code from the file into memory 111 and sets up the registers in processor 103 so that they execute the operating system's code. The difference between GHE loader 318 and the operating system loader is that it does not require the presence of the operating system and can thus itself load the operating system.

In order to properly load an executable file, GHE loader 318 must be able to deal with the format used in the executable file and must know where the executable file must be placed in memory. In a preferred embodiment, the executable file must be loaded in memory 111 at a location above GHE layer 201 itself. GHE loader 318 in a preferred embodiment is further able to load executable files that are in the Microsoft FAT16 format as well as boot images which are simply a sequence of bytes in a file.

Once GHE layer 201 is loaded, it of course responds to interrupts from the hardware environment, and is thus able to accept a boot command issued from a character terminal. In the preferred environment, there are four boot commands:

boot sd(BusNumber, Target, LUN) OptionalText
    boot st(BusNumber, Target, LUN) OptionalText
    boot fd(filename) OptionalText
    boot boot sd and boot st are used for boot images stored on SCSI disks and SCSI tapes respectively; the arguments for the command are as follows: BusNumber specifies the number of the SCSI bus the device is attached to, Target specifies the tape or disk drive on the bus, and LUN the logical unit number (LUN) for the block on the disk at which the program begins. Loader 318 loads the file of executable code at the location specified by BusNumber, Target, and LUN into memory 111 above GHE layer 201.

boot fd (filename) is used to load the file of executable code from a floppy disk or any other file system that uses the Microsoft FAT16 format. filename is the pathname of the file that contains the executable code to be loaded. Using filename, loader 318 reads the file system information contained in the floppy disk to locate the first block of the file specified by filename. It then loads the executable code contained in the file's blocks into memory 111 above GHE layer 201.

boot is used to load the executable code from a file specified in a predefined bootstring. The file is specified in the bootstring in the same fashion as in the foregoing boot commands. Up to three bootstrings may be specified, and boot loads from the first one that describes an accessible executable file.

It should be noted here that while loader 318 is used in the preferred embodiment to load operating system 203, it can in fact be used to load any executable code that satisfies two conditions:

it is contained in a file that loader 318 can locate and read; and
    it only requires the generic hardware interface provided by GHE layer 201 to execute.

As long as the file of executable code satisfies the above requirements, it can be produced using whatever operating system and hardware environment is available to the person writing the code and can then be run on GHE layer 201Conceptually, loader 318 is a loader of the general form shown in FIG. 7. There is a file locator 701 for each of the file systems from which loader 318 can read executable files. In the preferred embodiment, there are two such locators 701, one for files in SCSI file systems and one for files in FAT16 file systems. In other embodiments, there may be more such file locators 701. Loader 705 then loads the file located by a given file locator 701 (*i*) such that the memory location occupied by the executable code is above that specified by Memstart 703, which marks the first memory position above the memory occupied by GHE layer 201.

Debugging Using GHE Layer 201

GHE layer 201 also includes code 322 for performing debugging operations on the code executing on GHE layer 201. This debugging capability is of course particularly useful when an operating system is being ported to the generic interface provided by GHE layer 201. In a preferred embodiment, GHE layer 201 provides debugger commands as follows. The commands in the preferred embodiment of course reflect the fact that the preferred embodiment is implemented in a hardware environment that includes an Intel Pentium processor:

break [address] [rwi] [124]

Set a breakpoint at the memory address given. This command is used to set both execution breakpoints and read/write/io breakpoints. The break command given with no arguments will show all currently set breakpoints. The execution breakpoints are shown first followed by the read/write/io breakpoints. The [address] field is the address of either the instruction to trap on or the memory address to trap on a read, write, or io operation. The field [rwi], if present, indicates the type of memory I/O operation to trap on. "r" indicates to trap on a memory read or write operation, excluding instruction fetches. "w" indicates to trap on any memory write only operation. "i" indicates to trap on an in or out operation (this only works with the lower 64 KB of memory). The length field, [124], indicates the size of the data operation to trap on, in bytes. If this size field is omitted it defaults to 4 bytes. An execution breakpoint, once hit, is automatically cleared. RWI breakpoints are persistent.

clear address [rwi] [124]

Clears either an execution or read/write/io access breakpoint at the address given. For uniqueness, when clearing a memory read/write/io breakpoint one must specify the proper [rwi] and size, [124], fields for that operation.

proceed

Continue execution from the current instruction pointer.

trace

Execute the next instruction in memory from the current instruction pointer.

halt

Halts the system. For an Intel PC this will result in a BIOS reboot operation.

start address

This command will transfer control from the GHE layer 201 to the address specified in memory.

The commands in, out, read, write, and dump have the following general format (note that the value field does not apply for the in, read, and dump commands):

command address value [124]

By default, it is assumed that the command is for a double word (4 bytes). If the operation is for a different byte size one must specify the byte size to get the behavior desired. For example, to write a byte into memory location 0x402000, one issues the command:

write 402000 EB 1

These commands are:

in address [124] This command will read in and display the data from the port address given.

out address value [124] This command will put the specified value out to the port address given.

read address [124] Read and display a value from the memory address.

write address value [124] Write the value specified into the memory address dump address [len] [124] This command will display the contents of memory in a dump format. For example if one issues the command "dump 401000 10" one receives a listing like:

00401000 03020100 07060504 0B0A0908 0F0E0D0C

. . . . . . . . . . . . . . . .

(address) (memory contents, in hex) char format)

Note: the dump command will display memory from the address given for the next 4 words if the [len] field is not specified. When specified, the [len] field is in bytes and 16 bytes are always displayed on each line.

Note: When reading this line the bytes in memory are shown in little-endian ordering. By this is meant that byte 0x00 is right most byte of the first word and grows towards the most significant byte moving from right to left.

Note: When examining and modifying the contents of memory and registers, the Register must be one of ALL, EIP, EAX, EBX, ECX, EDX, ESI, EDI, EBP, ESP.

reg name [value]

Allows the user to read all Intel processor registers and to set the value of most registers. All the registers reported under the status command can be used with this command using the register name. This command will display the full register as a hexadecimal value. Registers supported are:

| Register Name | Note |
| --- | --- |
| EAX, EBX, ECX, EDX | read/write |
| EBP, ESI, EDI, ESP | read/write |
| EIP | read/write |
| CS, DS, ES, FS, GS | read only |
| EFLAGS | partial read/write (some bits cannot be altered to protect the state of GHE layer 201 |
| CR0, CR2, CR3, CR4 | read only |
| DR0, DR1, DR2, DR3, DR6, DR7 | read/write (Note: these are the debug registers provided in the P6 chip to support traps on read/write operations. The register values are modified by the break and clear commands. Arbitrary changes by the reg command of these registers can make the information shown by the break command invalid.) |

Note: the user must be careful with this command as no checking is performed to keep the user from trashing the system register state!

Note: changes in register values are put into the current context block on the stack which is used by the processor to set its registers when one continues from the current breakpoint. Register changes are not propagated automatically down the context block chain.

status [address]

Show the contents of all registers. If an address is not specified the status of the current register values is displayed. Note that this information will also be the same as that of the current GHE layer 201 context block. The command also shows the current exception number and the address of the next context block on the stack. This information is displayed in the first two lines of the status command similar to:

Exception Number: 3

This CB Addr: 001320CC Next CB Addr: 00126458

The status command can be used to walk back the context block chain. If one specifies the next CB Address value as the argument to the status command, the debugger will process the new context block and show the values of all the registers at the time of the exception. One can continue this process until the Next CB Address value is the null pointer of 0xFE200000. To support this, GHE layer 201's context block layout is shown below (relative to the context block start address—the "this CB Address" value):

| Offset | Description |
| --- | --- |
| 0x0 | exception number |
| 0x4 | next context block address |
| 0x8 | eax |
| 0xC | edx |
| 0x10 | ecx |
| 0x14 | ebx |
| 0x18 | ebp |
| 0x1C | esi |
| 0x20 | edi |
| 0x24 | esp |
| 0x28 | copy of eflags |
| 0x2C | copy of eip |
| 0x30 | gs (16 bit value) |
| 0x32 | fs (16 bit value) |
| 0x34 | es (16 bit value) |
| 0x36 | ds (16 bit value) |
| 0x38 | arg0 |
| 0x3C | arg1 |
| 0x40 | halt condition |
| 0x44 | GHE 201 layer pre handler return addr |
| 0x48 | error code |
| 0x4C | eip |
| 0x50 | cs (16 bit value) |
| 0x52 | pad (16 bit value) |
| 0x54 | eflags |
| 0x58 | pad value |

Figure 6:
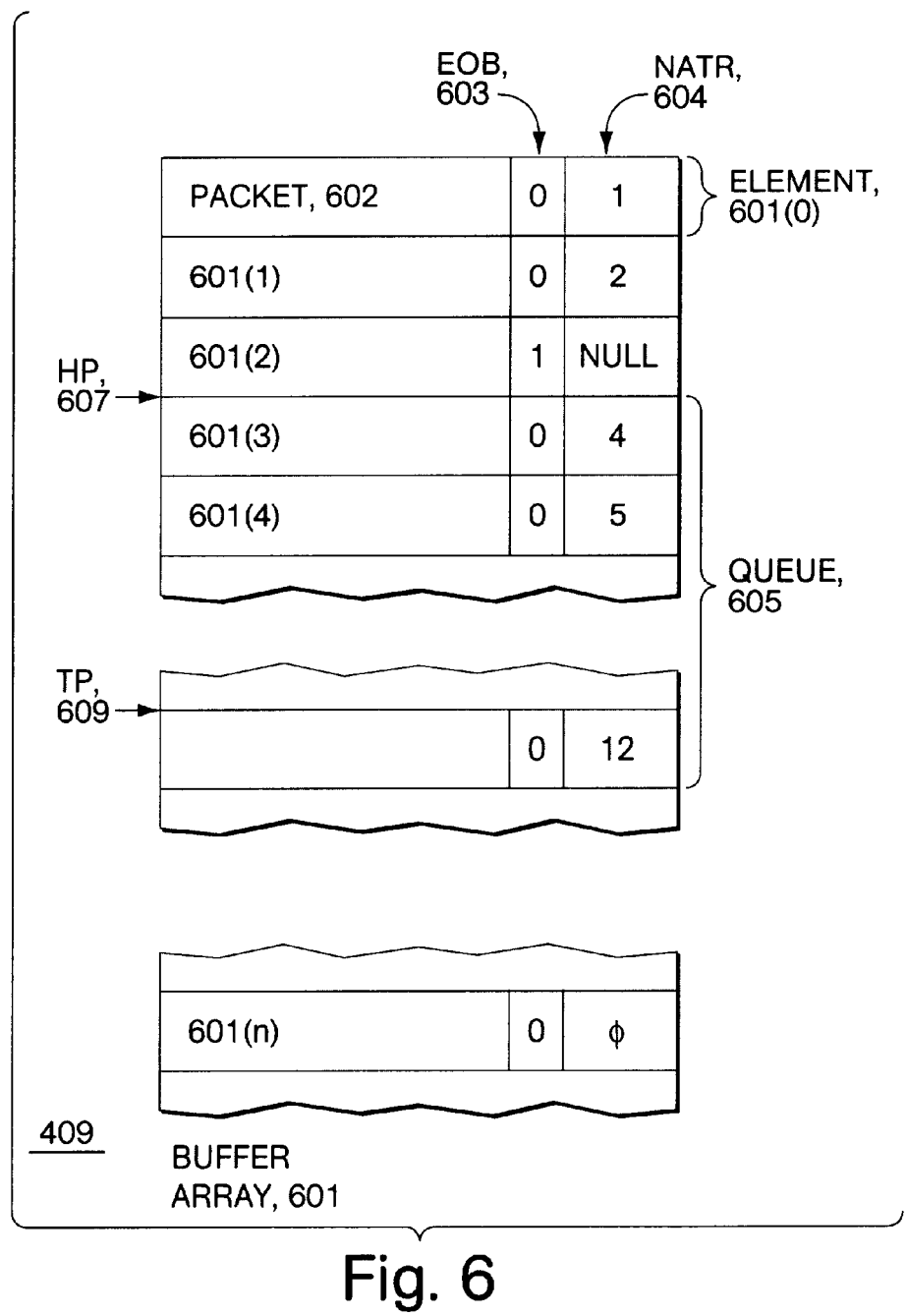
FIG. 6 shows an array of LAN packet buffers employed in a preferred embodiment.

Preventing End-of-buffer Conditions in Buffers Used for LAN Packets: FIG. 6

As indicated above, one of the generic interfaces which GRE layer 201 provides to operating system 203 is a generic interface to a LAN controller. Using the interface, operating system 203 can perform the generic operations indicated at 517 in FIG. 5. A difficulty with performing these operations at a level below that of operating system 203 is that operating system 203's dynamic memory allocation facilities are not available to GHE layer 201. LAN buffers 409 has a fixed amount of space in memory 111 and can thus accommodate only a fixed number of buffers for containing LAN packets.

FIG. 6 shows buffer array 601 which is used in GHE layer 201 to store incoming packets received from the LAN controller. Each element 601(*i*) has three parts that are of interest here: space 602 for an incoming packet, an end of buffer bit 603, and a next pointer 604. In all of the elements 601(0 . . . n) whose EOB bits 603 are not set, next pointer 601 points to the next element in the array; in the case of element 601(*n*), it points to element 0. The element whose EOB bit is set (here, element 602(2)) has a null value in NPTR 604. EOB 603 and NPTR 604 are required by the standard interface to the LAN controller, which requires that each buffer contain a next pointer 604 to the next buffer in which the LAN can place a packet and an end-of-buffer bit (EOB) 603. The LAN controller uses next pointer 604 to set up the write to the next element 601(*i*+1) while it is completing the write to the current element 6091(*i*). If EOB 603 is set in a buffer, that buffer is the last available buffer. After the LAN controller has written a packet to the buffer that has the EOB bit set, it issues an "out of resources" interrupt to GHE layer 201 and immediately begins discarding any further packets that it receives. It continues discarding packets until it is reset. In GHE layer 201, this is done in response to a ResetLAN software interrupt. As made clear in the foregoing discussion of how GHE layer 201 uses the system timer, resetting the LAN controller is a complex and time-consuming operation. All of the discarded packets that the controller receives from the time it encounters the EOB bit to the time that it is reset must be resent by their sources.

Where the program that is managing the buffers for the incoming LAN packets has available to it the dynamic memory allocation facilities provided by the operating system, the program can always allocate new buffers, and consequently, the LAN controller will encounter a buffer with its EOB bit set only when the operating system itself has no more memory to allocate. When that occurs, the fact that there are no more LAN buffers is only one of the smaller problems being confronted by the computer system.

Where the program that is managing the buffers for the incoming LAN packets does not have those facilities available, dealing with the EOB bit is a serious problem. Unless the amount of storage that has been statically allocated for LAN buffers is huge, the controller will encounter the EOB bit fairly frequently and when it does, it will discard packets as described above. The need to resend the discarded packets can substantially decrease the LAN's bandwidth.

In buffer array 601, the problem of avoiding EOB conditions is dealt with as shown in FIG. 6. Buffer array 601 contains a queue 605 of elements 601 (4 . . . k) to which the LAN controller has written packets. A head pointer 607 points to the first buffer element 601(3) that contains a packet that has been received and not yet processed by GHE layer 201 and a tail pointer 609 points to the last element 601(*k*) that contains a packet that has been received and not yet processed. As described above, when operating system 203 performs the ReceiveLANBuffer operation, GHE layer 201 provides it with head pointer 607; when operating system 203 performs the FreeLANBuffer operation, GHE layer 201 sets head pointer 607 to point to the next element 601(*i*+1) in array 601, which is the new head of queue 605. Similarly, when the LAN controller receives a packet, it writes it to element 601(*k*+1) following the current tail of the queue and GHE layer 201 updates tail pointer 609 to point to element 601(*k*+1). Of course, when either head pointer 507 or tail pointer 509 is incremented after pointing to element 601(*n*), it wraps around, that is, its value is reset to point to buffer 601(0).

To make queue 605 work with the EOB bit, the EOB bit must always be set in element 601(*i*−1) that immediately precedes element 601(*i*) currently pointed to by head pointer 607. The FreeLANBuffer operation takes care of this when it returns the buffer 601(*i*) pointed to by head pointer 607 after it has been processed by operating system 203. In moving the set EOB bit, it performs the following steps:

1. Check whether the LAN controller has issued an "out of resources" interrupt; if it has, return.
2. Check whether the element 601(*i*−1) ahead of element 601(*i*) pointed to by head pointer 607 is free (i.e., not in queue 605; this is done by comparing the values of HP 607 and TP 609); if it is not, return.
3. if element 601(*i*−1) is free, move the set EOB bit from element 601(*i*−2) to element 601(*i*−1) by doing the following:
    a) set EOB bot 603 in element 601(*i*−1);
    b) set NPTR 604 in element 601(*i*−1) to NULL;
    c) check whether the LAN controller has issued an "out of resources" interrupt; if it has, return;
    d) set NPTR 604 in element 601(*i*−2) to point to element 601(*i*−1); and
    e) reset EOB bit 603 in element 601 (*i*−2); and
4. return.

The preferred embodiment responds to the "out of resources" interrupt by emptying the entire queue 605 before it reinitializes circular queue 505 and resets the LAN controller. This is done to prevent a series of resets at short intervals, as might happen if only one element of the queue were emptied prior to the reset. When array 601 is initialized prior to reset, head and tail pointers 607 and 69 are both set to point to element 601(0) and EOB bit 603 is set in element 601(n).

Conclusion

The foregoing Detailed Description has disclosed to those skilled in the technologies to which the inventions described herein pertain the best mode presently known to the inventors of making and using those inventions. It will be immediately apparent to those skilled in the pertinent technologies that there are many ways of implementing apparatus and methods that incorporate the principles of the inventions. For example, the hardware environment for which a generic interface layer is provided in the embodiment described herein has an Intel processor and is specialized for LAN and file operations. Other hardware environments may employ different processors and may be specialized for other operations, but a generic interface layer may be built according to the principles disclosed herein for any hardware environment.

Similarly, the loader disclosed herein is particularly useful in a generic interface layer, but loaders built according to the principles disclosed herein may be used in any situation where it is desirable to load a program on a hardware environment before an operating system is running on the hardware environment. The same is true of the program coordination techniques involving the system timer interrupt code. They are particularly useful in the generic interface layer, but can be used anywhere where execution of program components need to be coordinated or where it is desirable to avoid lengthy suspension of operation of a program. The technique for moving the end-of-buffer bit along with the head of a queue of buffers, finally, is useful in any situation where LAN packets are being received in statically-allocated storage.

For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. A generic interface layer which executes in a hardware environment, the hardware environment including a plurality of devices and producing a plurality of interrupts and the generic interface layer being used by an executing program to control and respond to the hardware environment, the generic interface layer comprising:

executable code including
software interrupt-driven driver code for the devices and
interrupt handler code for the interrupts, the interrupt handler code executing in response to the interrupts to perform callbacks to callback code in the program; and a generic interface of software interrupts that the program uses to execute the driver code and wherein the interrupts include a system clock interrupt;

the interrupt handler code includes system clock interrupt handler code that is executed in response to the system clock interrupt; and code executing in the generic interface layer may register itself or other code with the system clock interrupt handler, the registered code being executed when the system clock interrupt handler code is executed.

2. The generic interface layer set forth in claim 1 wherein:

executing driver code registers other code with the system clock interrupt handler and returns, whereby the program does not suspend execution until completion of execution of the other code.

3. The generic interface layer set forth in claim 1 further comprising:

a stack upon which the interrupt handler code and the callback code execute.

4. The generic interface layer set forth in claim 3 wherein:

the stack is accessible to the program.

5. The generic interface layer set forth in claim 1 further comprising:

loader code that, when executed, loads the program and sets up the hardware environment so that the hardware environment begins executing the program, the loader code including file locator code that, when executed, locates the program in a set of files that are accessible via the hardware environment.

6. The generic interface layer set forth in claim 5 wherein:

the file locator code further locates the program in sets of different kinds of files that are accessible via the hardware environment.

7. Apparatus for carrying out an operation for a program without suspending execution of the program until completion of the operation, the apparatus comprising:

a register data structure in which executing code registers itself or other code;

system clock interrupt handler code which executes in response to a system clock interrupt, the system clock interrupt handler code operating during execution to execute code registered in the register data structure; and code for a plurality of suboperations of the operation, the code for the first suboperation registering the code for a next one of the suboperations and returning.

\* \* \* \* \*